United States Patent
Tormasov et al.

(10) Patent No.: US 11,720,452 B2
(45) Date of Patent: Aug. 8, 2023

(54) SYSTEMS AND METHODS FOR DETERMINING DATA STORAGE INSURANCE POLICIES BASED ON DATA FILE AND HARDWARE ATTRIBUTES

(71) Applicant: Acronis International GmbH, Schaffhausen (CH)

(72) Inventors: Alexander Tormasov, Moscow (RU); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 200 days.

(21) Appl. No.: 17/361,551

(22) Filed: Jun. 29, 2021

(65) Prior Publication Data

US 2022/0413970 A1    Dec. 29, 2022

(51) Int. Cl.
   *G06F 11/14* (2006.01)
(52) U.S. Cl.
   CPC ................................ *G06F 11/1469* (2013.01)
(58) Field of Classification Search
   CPC .......................... G06F 11/1469; G06F 11/1461
   See application file for complete search history.

(56) References Cited

U.S. PATENT DOCUMENTS

| | | | |
|---|---|---|---|
| 8,200,527 B1 * | 6/2012 | Thompson | G06Q 30/00 705/7.41 |
| 9,253,055 B2 * | 2/2016 | Nelke | H04L 41/5051 |
| 10,671,431 B1 * | 6/2020 | Dolan | G06F 3/0649 |
| 11,341,994 B1 * | 5/2022 | Goker | G11B 5/40 |
| 2015/0363270 A1 * | 12/2015 | Hammer | G06F 16/128 711/162 |
| 2019/0333083 A1 * | 10/2019 | Thanawala | G06Q 10/107 |
| 2021/0133168 A1 * | 5/2021 | Nara | G06F 11/1453 |
| 2022/0383900 A1 * | 12/2022 | Goker | G11B 5/40 |

* cited by examiner

*Primary Examiner* — Merilyn P Nguyen
(74) *Attorney, Agent, or Firm* — ArentFox Schiff LLP; Michael Fainberg

(57) ABSTRACT

Disclosed herein are systems and method for determining data storage insurance policies. In an exemplary implementation, a method comprises receiving a request to add a data storage insurance policy to a plurality of data files. The method comprises extracting data file attributes and determining a data recovery score for each respective data file based on a uniqueness, criticality, and/or importance of the respective data file. The method comprises determining a hardware score for each of a plurality of performance tiers comprising at least one storage server, based on an available capacity, a performance cost, and/or data recovery scores of data files currently stored at each of the plurality of performance tiers. The method comprises selecting and executing a data storage insurance policy for the respective data file based on a plurality of data recovery rules and/or the comparison of the data recovery score and the hardware score.

27 Claims, 6 Drawing Sheets

SYSTEMS AND METHODS FOR DETERMINING DATA STORAGE INSURANCE POLICIES BASED ON DATA FILE AND HARDWARE ATTRIBUTES

FIELD OF TECHNOLOGY

The present disclosure relates to the field of data recovery, and, more specifically, to systems and methods for determining data storage insurance policies based on data file and hardware attributes.

BACKGROUND

Data storage insurance provides users with the confidence that their data files (e.g., documents, media, etc.) are protected and recoverable. In the event that data loss occurs, users are fully or partially compensated based on the damages the user faces. Accordingly there is a sense of security given to the user. From the perspective of storage service providers, the insurance service offers additional revenue that the service owner can use to improve the quality of its storage systems (e.g., hardware and software).

The more valuable certain data is, the more reliable the storage scheme needs to be. For example, for highly important files, maximum redundancy and the lowest latency storage devices may selected. However, executing a data insurance policy effectively is difficult. For example, a storage service provider may have many users and limited high performance storage devices. If users begin to mark each file as highly important (even when they are not) and high performance storage devices get used to capacity, future files that may actually require storage in high performance storage devices may not be stored properly.

In addition to the finite number of resources that a storage service provider may have, the cost for storage and restoration of a file may be well beyond the value of a file. Thus, rather than spending computational resources on storing and recovering the file, it may be in the interest of the storage service provider to simply compensate the user in the event of a data loss.

Based on these issues, there exists a need for evaluating whether resources should be put behind a file for recovery.

SUMMARY

To address the shortcomings described above, aspects of the disclosure describe methods and systems for determining data storage insurance policies based on data file and hardware attributes.

In one exemplary aspect, a method may comprise receiving, by a processor from a computing device, a plurality of data files for storage and a request to add at least one data storage insurance policy to the plurality of data files for protection against data loss. For each respective data file of the plurality of data files, the method may comprise extracting, by the processor, data file attributes comprising information on access history, storage at the computing device, and metadata of the respective data file. The method may comprise determining, by the processor, a data recovery score for the respective data file based on at least one of a uniqueness and a criticality, and, in some aspects, an importance of the respective data file. In some aspects, the uniqueness is a likelihood of the respective data file being present on a sample computing device, the criticality is a likelihood of a different file on the sample computing device having a dependency on the respective data file, and the importance is a value manually set by a user of the computing device. The method may comprise determining, by the processor, a hardware score for each of a plurality of performance tiers comprising at least one storage server, based on at least one of an available capacity at each of the plurality of performance tiers, a performance cost for storing the respective data file, and, in some aspects, data recovery scores of data files currently stored at each of the plurality of performance tiers. The method may comprise comparing, by the processor, the data recovery score of the respective data file and the hardware score and selecting, by the processor, a data storage insurance policy for the respective data file based on a plurality of data recovery rules and the comparison. The method may comprise executing, by the processor, the data storage insurance policy.

In some aspects, storage servers of each of the plurality of performance tiers meet different minimum performance ratings, wherein the minimum performance ratings comprise at least one of: processing speed, memory, storage capacity, data retrieval speed, and network access latency.

In some aspects, the data storage insurance policy indicates a redundancy of the respective data file, wherein the redundancy comprises storing the respective data file in multiple storage servers of one of the plurality of performance tiers.

In some aspects, the data storage insurance policy indicates a recovery time threshold that is a maximum amount of time needed to recover the respective data file in an event of data loss.

In some aspects, the data storage insurance policy indicates a compensation amount provided to the user in an event that the respective data file cannot be recovered due to data loss.

In some aspects, the method may comprise comparing the data recovery score of the respective data file and the hardware score by determining whether the data recovery score is greater than the hardware score of a given performance tier of the plurality of performance tiers.

In some aspects, in response to determining that the data recovery score is not greater than the hardware score for any performance tier of the plurality of performance tiers, the method may comprise selecting a data storage insurance policy in which the respective data file is not stored in any of the plurality of performance tiers and the user is compensated in an event of data loss.

In some aspects, the method may comprise determining the uniqueness of the respective data file using a machine learning algorithm trained using a dataset that comprises data attributes of sample data files in a plurality of sample computing devices and a count of the plurality of computing devices that include each sample data file.

In some aspects, the method may comprise determining the criticality of the respective data file using a machine learning algorithm trained using a dataset that comprises data attributes of sample data files in a plurality of sample computing devices and a count of files on the plurality of computing devices that depend on each sample data file to be accessed.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
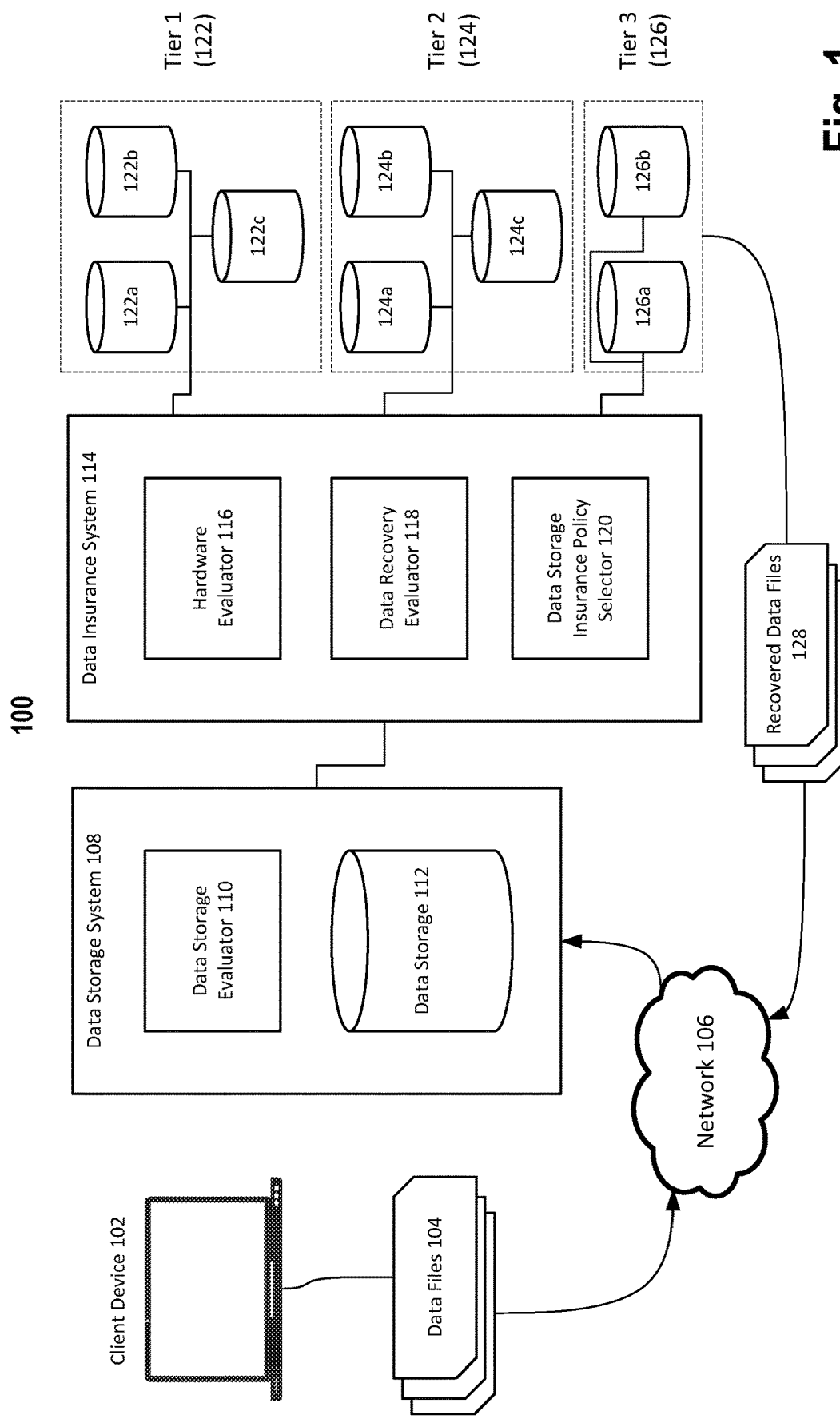
FIG. 1 is a block diagram illustrating a system for determining data storage insurance policies based on data file and hardware attributes.

Exemplary aspects are described herein in the context of a system, method, and computer program product for determining data storage insurance policies based on data file and hardware attributes. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The issue of properly identifying whether resources should be put behind a file for its recovery directly affects data storage insurance (DSI) policies. In a typical scenario, a user pays a premium for storing his/her files under a particular policy. Suppose that recovery performance is divided into multiple tiers where the top tier offers the highest redundancy and lowest recovery latency. In an uneven scenario, two users are storing their files using the same performance tier. The value of the second user's file, however, is significantly lower than the first user's file. For example, the first user may be storing a classified unique security file and the second user may be storing a common file. In conventional systems, because both files are manually marked by their users are "important," they are both assigned the same tier. However, if data loss were to occur, the compensation provided to the first user (i.e., the penalty for the storage service provider) will be a lot higher than the compensation provided to the second user. Despite this disparity, the computational resources being used to store the files is the same. This uneven scenario depicts that the storage service provider has greater incentive to put resources behind the first user's file and not behind the second user. Not only would it be easier to compensate the second user in the event of a data loss, but the second user's file may be taking space for a future user who has a file that should be stored in that particular performance tier.

On the other hand, the cost of reimbursing lost data may turn out to be too high in some cases and may cause losses to the provider if the DSI policy is chosen incorrectly. For example, the provider may incorrectly assign an insurance premium that is too low and the data may be stored with a high risk of loss. A problem arises when the provider needs an independent automated system for assessing the importance and uniqueness of data (which may not coincide with the assessment that the user—the owner of the data— manually gives to this data). Accordingly, based on its own assessment, the provider can receive a significant insurance premium, while minimizing the risks of data loss, which can dramatically reduce the likelihood of a situation where the provider will have to pay reimbursement to the user of the storage service.

During the loss or corruption of data, the speed of data recovery also plays a crucial part in DSI. It should be noted that the faster it is necessary to restore certain data, the more expensive it is to store said data. In some cases, a storage device not providing the required recovery rate is equivalent to the loss or destruction of data.

The present disclosure describes implementations of automatically identifying the optimal DSI policy for data loss. The implementations involve evaluation and classification of stored data depending on their type, importance, criticality, uniqueness, etc., and definition of storage strategy including redundancy, recovery speed, etc.

From a high level, the present disclosure describes evaluating data and determining here to store said data based on the required redundancy, accessibility, and latency. In some aspects, this determination is based on analyses of user backups and similar backups of other similar users. Depending on data severity, the present disclosure describes choosing different data storing strategies (e.g., store algorithm of restoration of data with references, store data once, store data with appropriate redundancy, continuously verify data, do not store a data (just pay if cannot restore), etc.). The evaluation considers characteristics of the data provided by the user. These characteristics include both subjective assessment by the user (e.g., severity date and import) and the results of automatic data classification (e.g., criticality, uniqueness). In some aspects, storage options depend on metrics like redundancy, accessibility, latency. The data can be stored with the usual redundancy factor, with an increased coefficient of redundancy (for data, the loss of which is very critical), on fast storage servers (for "hot" data, the recovery of which is necessary in the shortest possible time), on slow storage servers (for data that does not need immediate recovery), or not stored at all (for data that is not unique and that can be easily restored from any other (public) sources, or the value of the data is so low that compensation for their loss is cheaper than the cost of storing them).

In one use case, the user defines the stored data as "critical." Accordingly, an expensive insurance policy is applied to them. The provider receives a high insurance premium and, accordingly, can use it to store data with the maximum degree of safety, making the risk of their loss virtually to zero. In another use case, the user chooses the cheapest insurance rate, which assumes low compensation in case of data loss or inability to recover it quickly. Thus, the provider can save on data storage by storing fewer copies or storing on slow servers.

FIG. 1 is a block diagram illustrating system 100 for determining DSI policies based on data file and hardware attributes. System 100 features client device 102, which may be any device that stores data and can communicate with a data storage service via network 106 (e.g., the Internet). For example, client device 102 may be a desktop computer, a laptop, a tablet, a smartphone, etc., that is uploading data files 104 (e.g., documents, media files, video games, applications, metadata, etc.) to a data storage service. The data storage service may comprise data storage system 108 and data insurance system 114.

Data storage system 108 represents a basic storage system in which uploaded data is stored in data storage 112. Data storage 112 may comprise a plurality of servers distributed across a physical area (e.g., a country). In some aspects, the servers are identical in terms of hardware and software attributes (e.g., processor, memory, network access, etc.). Data storage evaluator 110 may determine which server to store data files 104 in based on the available capacity of a server, the physical distance from a location of client device 102, the number of network hops across network 106 between client device 102 and the server of data storage 112, and/or the availability of the server (e.g., whether it is being repaired, is shut down, compromised, etc.). Ultimately, when client device 102 uploads data files 104, data storage evaluator 110 stores a copy of data files 104 in the selected server of data storage 112.

In some aspects, client device 102 may directly access data files 104 from data storage 112 via network 106. For example, a user may be interested in freeing space on client device 102 and may shift data files 104 to the "cloud" (i.e., data storage system 108). If the uploaded data files 104 are lost on data storage 112, the user may permanently lose the information. Accordingly, the user may also be interested in insuring data files 104 using a DSI policy. A DSI policy may be a supplementary storage agreement executed by data insurance system 114. The DSI policy may indicate, for each data file of data files 104, the number of additional copies to be stored, the number of insurance servers where the copies are distributed across, a recovery time threshold for how quickly a lost file must be recovered at data storage 112, a latency between data storage 112 and an insurance server (e.g., based on number of network hops or physical distance or network quality accessibility), a compensation to the user (in the event that the data file is not recovered), and a premium price paid to the data storage provider.

Data insurance system 114 is configured to determine the proper DSI policy for a data file. Data insurance system 114 comprises hardware evaluator 116, data recovery evaluator 118, DSI policy selector 120, and a plurality of insurance servers 122, 124, and 126. In the event that data files 104 uploaded to data storage 112 are lost, data insurance system 114 transmits recovered data files 128 to data storage 112 (e.g., via network 106).

Each of the plurality of insurance servers are assigned a performance tier. For simplicity, three tiers are depicted in FIG. 1. One skilled in the art would appreciate, however, that there may be additional or fewer tiers. In system 100, insurance servers are storage servers that are part of data insurance system 114. Insurance servers 122a, 122b, and 122c are part of tier 1, which may be the best performing servers. Insurance servers 124a, 124b, and 124c are part of tier 2, which may be a mid-tier performance group. Insurance servers 126a and 126b are part of tier 3, which may be a low-end performance group. It should be noted that a data storage service may offer a plurality of performance tiers, wherein each performance tier has its own DSI policy. For example, tier 1 insurance servers may have a DSI policy that guarantees that a data file is stored at a particular redundancy, with low latency, the fastest recovery rate. Tier 2 insurance servers may have a DSI policy that guarantees that a data file is stored at a lower redundancy, with medium (relatively speaking) latency, and a normal recovery rate. Tier 3 insurance servers may have a DSI policy that guarantees an even lower redundancy, with the highest latency, and the slowest recovery rate.

In some aspects, a first performance tier may offer high redundancy and hot storage, a second performance tier may offer high redundancy and cold storage, a third performance tier may offer low redundancy and hot storage, a fourth performance tier may offer low redundancy and cold storage, etc.

DSI policy selector 120 may store a data structure that lists each tier and the associated DSI policy for said tier. DSI policy selector 120 may select which DSI policy should be assigned to a particular data file based on analyses performed by hardware evaluator 116 and data recovery evaluator 118. Data recovery evaluator 118 may analyze the data file attributes of a data file. In particular, evaluator 118 may determine, using the data file attributes, the uniqueness of the file (i.e., how common the data file is in a group of sample computing devices), the criticality of the file (i.e., how many other files depend on the file to run), and the importance of the file (e.g., a subjective rating provided by the user). Hardware evaluator 116 may query the state of the plurality of insurance servers. In particular, hardware evaluator 116 may determine, for each tier, a remaining capacity of the insurance servers, a cost ratio between the premium being paid and the costs for running the hardware to store the respective data file (as they may change over time), and the data evaluation of the data already stored in the insurance servers of the tier. DSI policy selector 120 may compare the results from both evaluators 116 and 118 to select an appropriate DSI policy for the data file.

Figure 2:
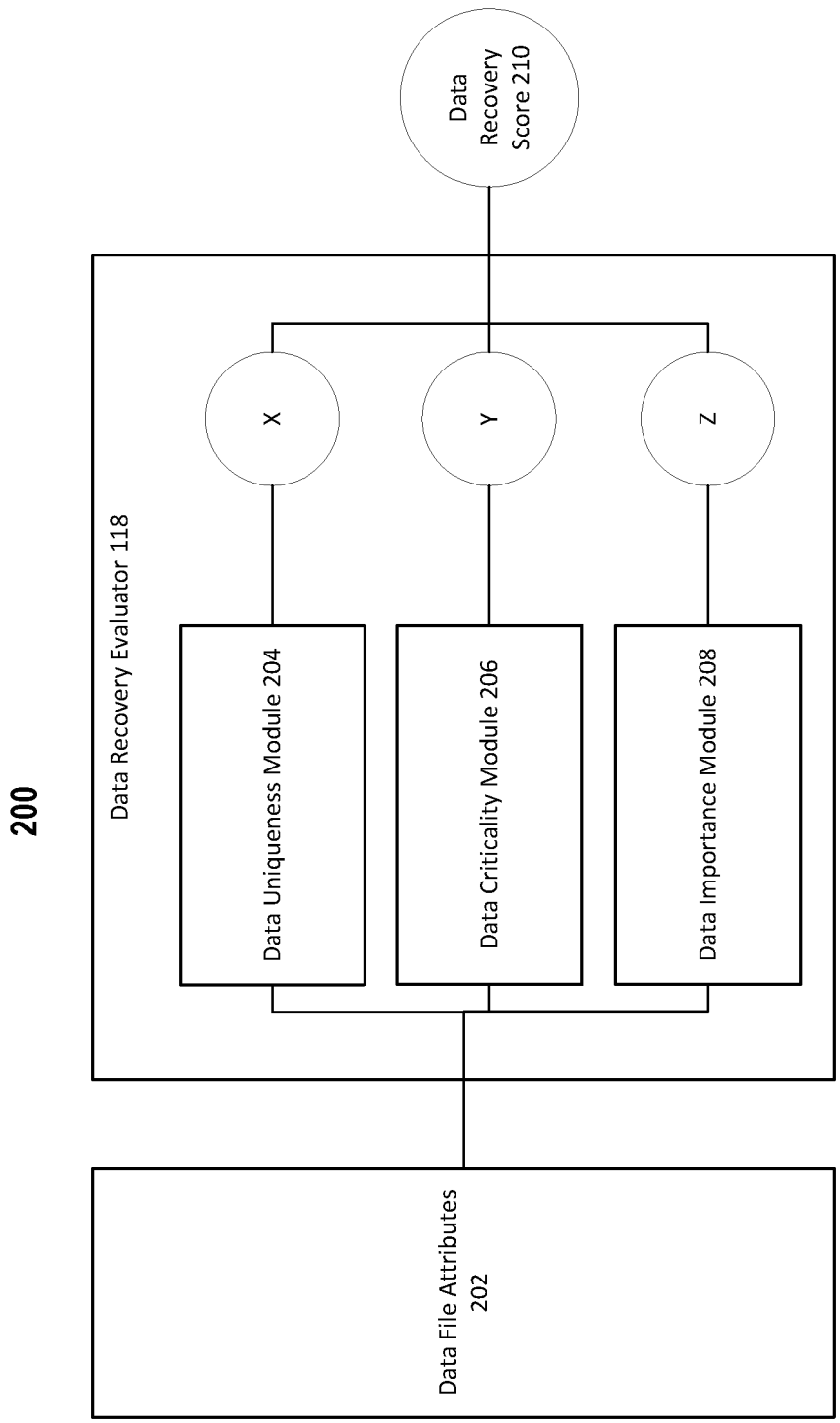
FIG. 2 is a block diagram illustrating a data recovery evaluator that determines a data recovery score.

FIG. 2 is block diagram 200 illustrating data recovery evaluator 118 that determines a data recovery score 210. In an exemplary aspect, data storage system 108 may receive data files 104 for storage and data insurance system 114 may receive a request to add at least one storage insurance policy to data files 104 for protection against data loss. For each respective file in data files 104, data recovery evaluator 118 may extract data file attributes 202, which include information on access history, storage at the computing device, and metadata of the respective data file.

Consider an example in which a user is uploading, to a data storage service, a folder with a plurality of text documents and files associated with a word editing application. The example of the data file attributes for two files are shown below:

TABLE 1

Data File Attributes 202

| Name | Size (MB) | Extension | Access Count | Creation Time | Last Modified | ... Directory |
|---|---|---|---|---|---|---|
| "My Budget" | 1 | doc | 5 | 23:45:01 6/1/21 | 02:01:01 6/15/21 | ... \Desktop\myplan |
| "README" | 0.05 | txt | 0 | 09:13:01 1/1/20 | 09:13:01 1/1/20 | ... \ProgramFiles\EditorApplication |
| ... | | | | | | |

As seen in the example table, data file attributes 202 includes metadata information (e.g., name, size, extension, etc.), access history (e.g., access count, modification time, creation time, etc.), and storage information (e.g., directory address).

Using data file attributes 202, data recovery evaluator 118 determines a data recovery score 210. Data recovery evaluator 118 comprises (1) data uniqueness module 204, which computes uniqueness value X of the respective data file, (2) data criticality module 206, which computes criticality value Y of the respective data file, and (3) data importance module 208, which determines importance value Z of the respective data file. The data recovery data score 210 is a function of uniqueness value X, criticality value Y, and importance value Z.

Importance value Z is a subjective assessment provided by the user of data files 104. In some aspects, data recovery evaluator 118 may request the user to provide an importance value to a respective data file (e.g., via a user interface generated on client device 102). For example, the importance value may be a value out of 10 (e.g., the maximum importance). The user may be prompted by data importance module 208 to provide a value (e.g., 5) that signifies what the user believes the importance of the file to be. It should be noted that conventional systems often solely rely on the user's assessment of importance. However, because many users may be accessing the data storage service and each user has a different understanding or sense of importance, the assessment is not entirely reliable. Accordingly, the believed importance of the data file is further combined with the uniqueness and criticality of the data file.

The uniqueness is a likelihood of the respective data file being present on a sample computing device. The more unique a data file is, the greater it is valued. This is because common files (e.g., installation files for commonly used applications) are easier to replace than rare files (e.g., an installation key text file). In some aspects, data uniqueness module 204 may determine the uniqueness value X of a respective data file using a machine learning algorithm trained using a dataset that comprises data attributes of sample data files in a plurality of sample computing devices and a count of the plurality of computing devices that include each sample data file. Suppose that the training dataset comprises attributes for files stored across 500 sample computing devices. The dataset may be structured in the same manner as described in table 1, but with an additional column that lists the output uniqueness. The uniqueness may be a ratio of a count value that represents how many of the sample computing devices include a particular file and the total number of sample computing devices. For example, an installation "README" text file may be present in 450 of the 500 computing devices. This indicates that there is a 90% chance of finding that data file in an arbitrary computing device. In this case, the file is not that unique and is valued less than a data file that is, for example, found in only 5% of computing devices. The machine learning algorithm may be a regression-based algorithm that is pre-trained by data insurance system 114. Data uniqueness module 204 may input the data file attributes 202 in the machine learning algorithm and receive an output value indicative of the likelihood of finding that data file in an arbitrary computing device.

Data criticality is a likelihood of a different file on the sample computing device having a dependency on the respective data file. For example, a particular executable file may be dependent on multiple library files and an application file (e.g., a .docx file) may be dependent on the executable of the application (e.g., Microsoft Word). If a particular data file serves as a dependency for other files, it is believed to be more valuable than a data file that is not needed by any other file. Data criticality module 206 may determine the criticality of a respective data file using a machine learning algorithm trained using a dataset that comprises data attributes of sample data files in a plurality of sample computing devices and a count of files on the plurality of computing devices that depend on each sample data file to be accessed. The training dataset for this machine learning algorithm may also be structured in the same manner shown in table 1, but with another column that has an output dependency likelihood. For example, a particular data file may have on average 40 files that dependent on the particular data file in order to run or be accessible as they are meant to be accessed across all sample computing devices storing the particular data file. Data criticality module 206 may normalize this dependency count with the highest dependency count on the sample computing devices. For example, a different file may have the highest dependency count of 100. Data criticality module 206 may divide 40 by 100 to get 40% as the output dependency count. The machine learning algorithm may be a regression-based algorithm that is pre-trained by data insurance system 114. Data criticality module 206 may input the data file attributes 202 in the machine learning algorithm and receive an output value indicative of the likelihood of finding that data file in an arbitrary computing device (e.g., 60%).

In order to arrive at data recovery score 210, data recovery evaluator 118 may combine values X, Y, Z. Consider an example including the files shown in table 1. The first file may have a 30% of being found in an arbitrary computing device, may support only 4 dependent data files (which is given a criticality value of 4%), and may be given an importance rating of 5 out of 10 (i.e., 50%). In some aspects, each value may be multiplied by a certain weight value. For example, data uniqueness may be weighted higher than data criticality. Accordingly, the value of Y may be multiplied by 0.5. It should be noted that files are rewarded for being critical, important, and rare. Accordingly, the value of X may be subtracted by 100%. Thus, there would be a 70% chance of the first file not being found in an arbitrary computing device. Suppose that all values are weighted equally. Data recovery evaluator 118 may average the three values, determine a median, determine a sum, etc., and set either the average, the median, the sum, etc., as the data recovery score 210. Suppose that the sum is determined as score 210. For this particular example, the first file will be assigned a score 210 of "124."

Figure 3:
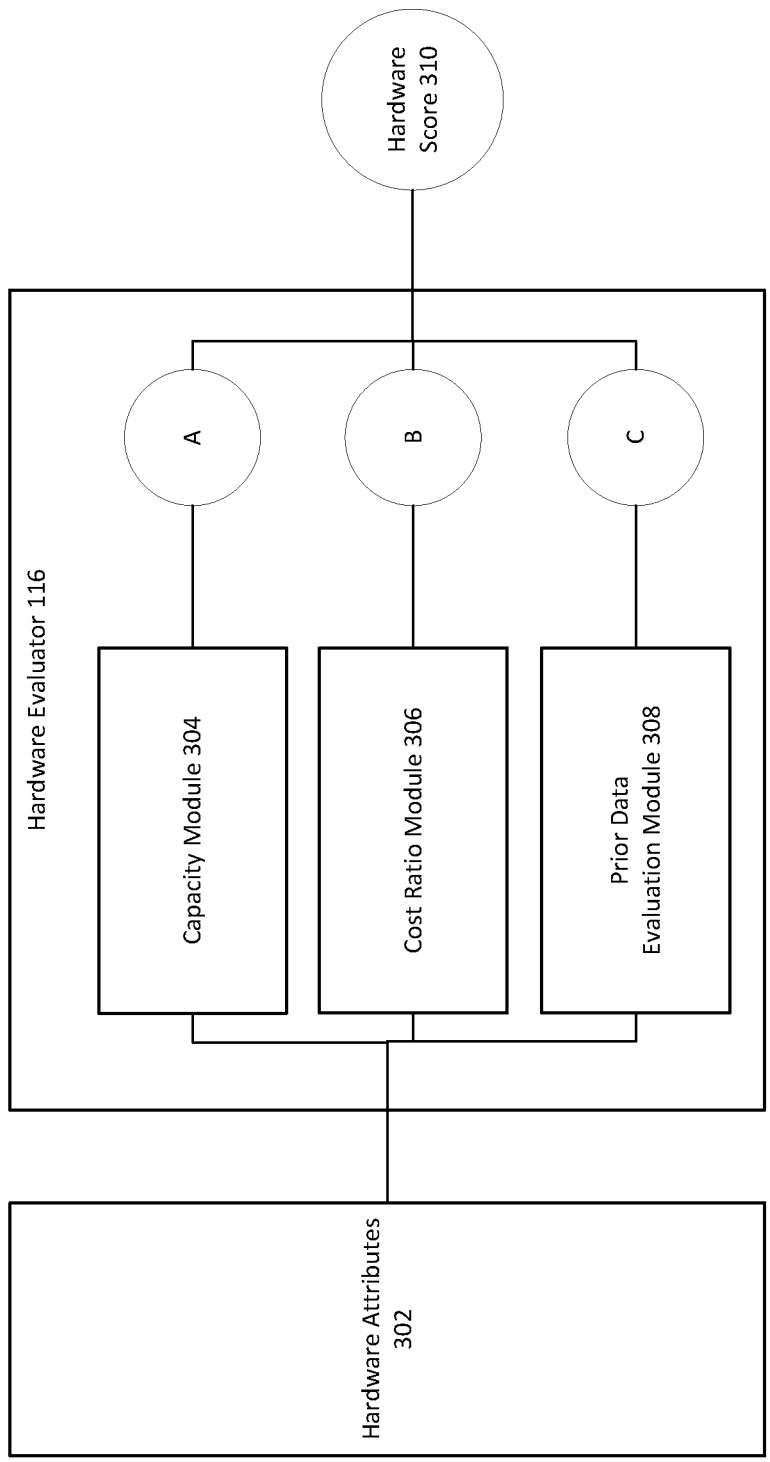
FIG. 3 is a block diagram illustrating a hardware evaluator that determines a hardware score.

FIG. 3 is block diagram 300 illustrating hardware evaluator 116 that determines a hardware score 310. Hardware evaluator 116 may include components such as capacity module 304, cost ratio module 306, and prior data evaluation module 308. Hardware evaluator 116 may extract hardware attributes 302 from servers 122, 124, and 126. An example of hardware attributes is shown below:

TABLE 2

Hardware Attributes 302

| Identifier | Capacity Available | Memory (GB) | CPU Usage | Network Connection | Hops to Data Storage 112 | ... | Premium |
|---|---|---|---|---|---|---|---|
| 122 | 1 TB | 16 | 40% | 4/5 | 4 | ... | $5 |
| 124 | 10 TB | 8 | 60% | 2/5 | 10 | ... | $2 |
| | | | ... | | | | |

Hardware evaluator 116 may determine hardware score 310 for each of a plurality of performance tiers (e.g., tiers 1, 2, 3) comprising at least one storage server (e.g., server 122, 124, 126, etc.), based on an available capacity at each of the plurality of performance tiers, a performance cost for storing the respective data file, and data recovery scores of data files currently stored at each of the plurality of performance tiers.

For example, capacity module 304 may determine that only 1 TB of space remains in tier 1 insurance servers from a total capacity of 100 TB. The capacity value A is therefore 1% (e.g., 1 TB divided by 100 TB). It should be noted that the less capacity available, the greater the value of the storage remaining. The cost ratio module 306 may then determine the ratio between the cost of storing the data file on that particular tier (e.g., running the hardware) and the premium paid by the user for using a DSI policy associated with the tier. For example, the cost per month may be $0.25 and the premium paid by the user may be $5. Thus, the ratio value B is 5%. Lastly, prior data evaluation module 308 may be configured to retrieve the data recovery score 210 of each data file stored in that particular tier (e.g., the scores may be stored once calculated in a database of data recovery evaluator 118). In some aspects, prior data evaluation module 308 may determine an average data recovery score of all retrieved data recovery scores. For example, the average recovery score may be 120. If the recovery score 210 of a candidate data file to be stored in a tier is greater, this indicates that the data file generally has greater value that the files already stored in the tier.

Hardware score 310 is a function of values A, B, C. In some aspects, each value is multiplied by a weight (e.g., 0.5) to scale each value. For example, if capacity is weighted higher than cost ratio, the value A may be multiplied by 5. In the example provided in table 2, the capacity value of 1%, cost ratio value of 5% and average recovery score of 120 may yield a hardware score of 130 (e.g., 5×1+5+120). Suppose that the hardware score 310 for tier 2 is determined as 125 and the hardware score 310 for tier 3 is determined as 120.

Figure 4:
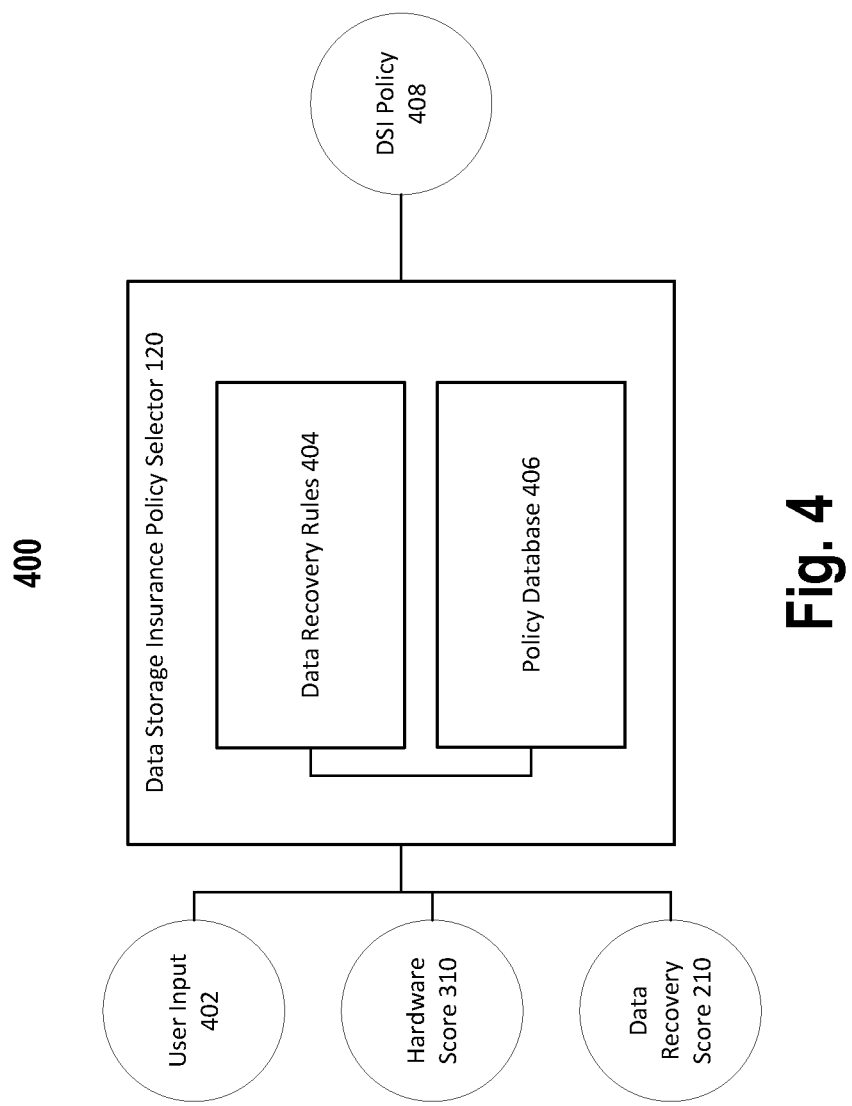
FIG. 4 is a block diagram illustrating a DSI policy selector that determines a DSI policy.

FIG. 4 is block diagram 400 illustrating a DSI policy selector 120 that determines a DSI policy 408. DSI policy selector 120 comprises two data structures: data recovery rules 404 and policy database 406. Policy database 406 maps out pre-determined policies to various performance tiers. As discussed previously, storage servers of each of the plurality of performance tiers meet different minimum performance ratings, wherein the minimum performance ratings comprise at least one of: processing speed, memory, storage capacity, data retrieval speed, and network access latency.

Associated with each tier are DSI policies that include different types of information. For example, the data storage insurance policy may indicate a redundancy of the respective data file, wherein the redundancy comprises storing the respective data file in multiple storage servers of one of the plurality of performance tiers. The data storage insurance policy indicates a recovery time threshold that is a maximum amount of time needed to recover the respective data file in an event of data loss (e.g., the user needs data recovered within 15 minutes). The data storage insurance policy also indicates a compensation amount provided to the user in an event that the respective data file cannot be recovered due to data loss.

DSI policy selector 120 is configured to compare data recovery score 210 of the respective data file and hardware score 310 of a particular tier to determine whether the respective data file has a value worth placing resources around further comprises determining whether the data recovery score is greater than the hardware score of a given performance tier of the plurality of performance tiers. Referring to the previous example, the hardware scores for the three tiers are 130, 125, and 120, respectively. The data recovery score is 124. Because the data recovery score is less than the hardware scores of the top two tiers, the respective data file is considered to not be worth the top two tiers. In the event that the data recovery score is lower than all hardware scores of possible performance tiers, the data is considered of low value. In this case, it is cost efficient to simply pay the user an agreed compensation instead of using computational resources to store copies of the data file. DSI policy selector 120 thus selects a data storage insurance policy in which the respective data file is not stored in any of the plurality of performance tiers and the user is compensated in an event of data loss.

In order to properly identify a DSI policy 408 for a respective data file, DSI policy selector 120 uses data recovery rules 404. Rules 404 represents a plurality of rules that assess how hardware score 310 for a given tier compares to data recovery score 210. Rules 404 further consider additional information provided by the user via user input 402. For example, the user may indicate a maximum amount of time it should take to recover lost data. The user may also indicate a maximum latency to access stored data. The user may also indicate a number of copies to make for a data file.

Rules 404 may be structured as if-else statements or decision trees that ultimately identify a DSI policy from a plurality of DSI policies. For example, a rule may state that if hardware score 310 is less than data recovery score 210 and the maximum amount of time to recover lost data is less than or equal to a recovery time threshold associated with a tier, to assign the data file to that particular tier. Another rule may state that even if data recovery score 210 is less than a hardware score 310, if the capacity of the tier is less than a certain threshold percentage, to assign the data file to that particular tier.

It should be noted that assigning a DSI policy to a data file does not immediately lead to the execution of the DSI policy. The user needs to accept the DSI policy and agree to the compensation details associated with the DSI policy (e.g., if the file is lost, the customer is paid X amount of dollars). Furthermore, it should be noted that of the plurality of data files uploaded, each different data file may be assigned a different DSI policy 408.

Figure 5:
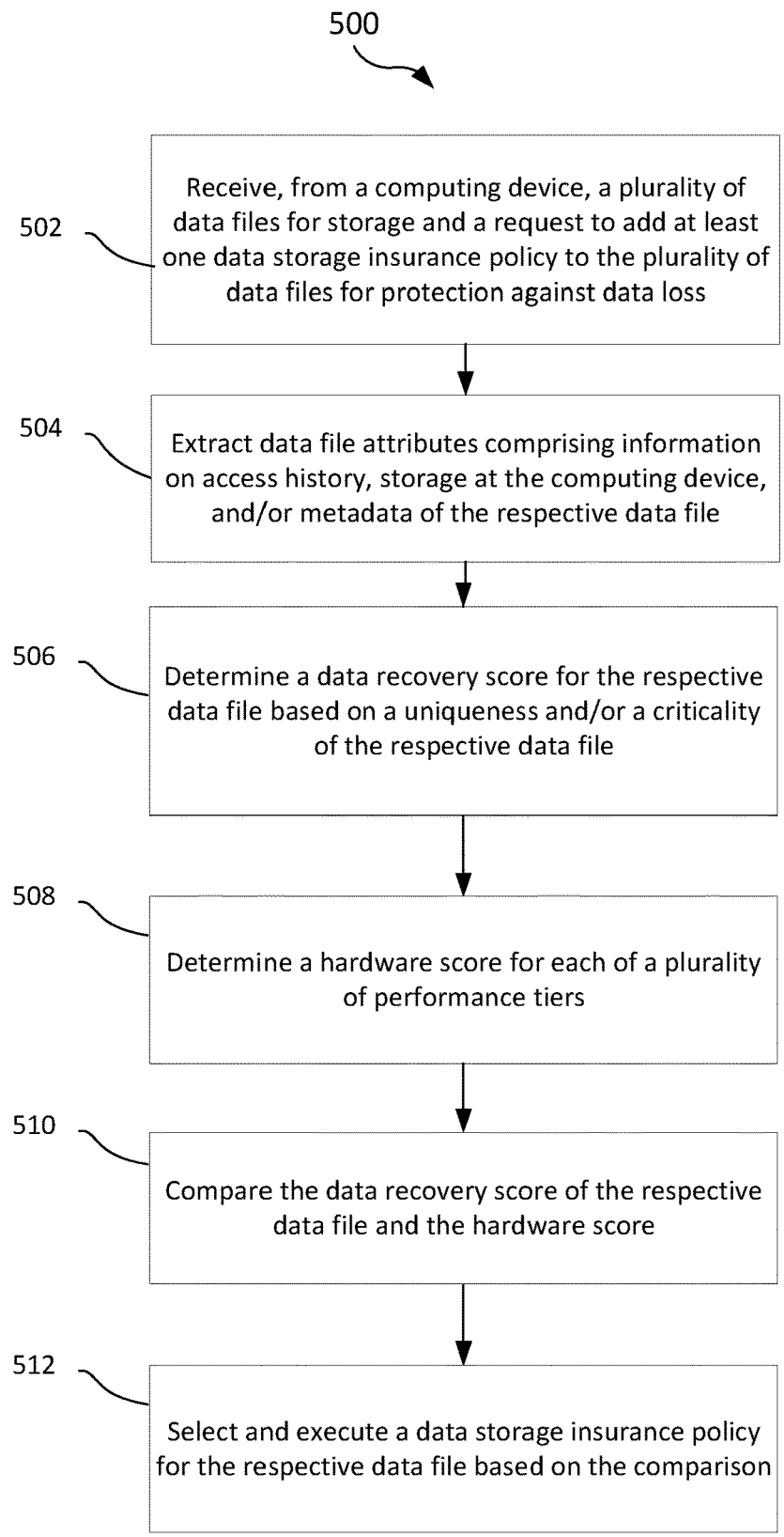
FIG. 5 illustrates a flow diagram of a method for determining data storage insurance policies based on data file and hardware attributes.

FIG. 5 illustrates a flow diagram of method 500 for determining DSI policies based on data file and hardware attributes. At 502, data insurance system 114 receives, from a computing device (e.g., client device 102), a plurality of data files (e.g., data files 104) for storage and a request to add at least one data storage insurance policy to the plurality of data files for protection against data loss. For each respective data file of the plurality of data files, data insurance system 114 performs the following.

At 504, data recovery evaluator 118 extracts data file attributes comprising information based on at least one of access history, storage at the computing device, and metadata of the respective data file. At 506, data recovery evaluator 118 determines a data recovery score for the respective data file based on at least one of a uniqueness and a criticality of the respective data file.

At 508, hardware evaluator 116 determines a hardware score for each of a plurality of performance tiers comprising at least one storage server, based on at least one of an available capacity at each of the plurality of performance tiers and a performance cost for storing the respective data file.

At 510, DSI policy selector 120 compares the data recovery score of the respective data file and the hardware score. At 512, data issuance system 114 selects and executes a data storage insurance policy for the respective data file based on the comparison.

Figure 6:
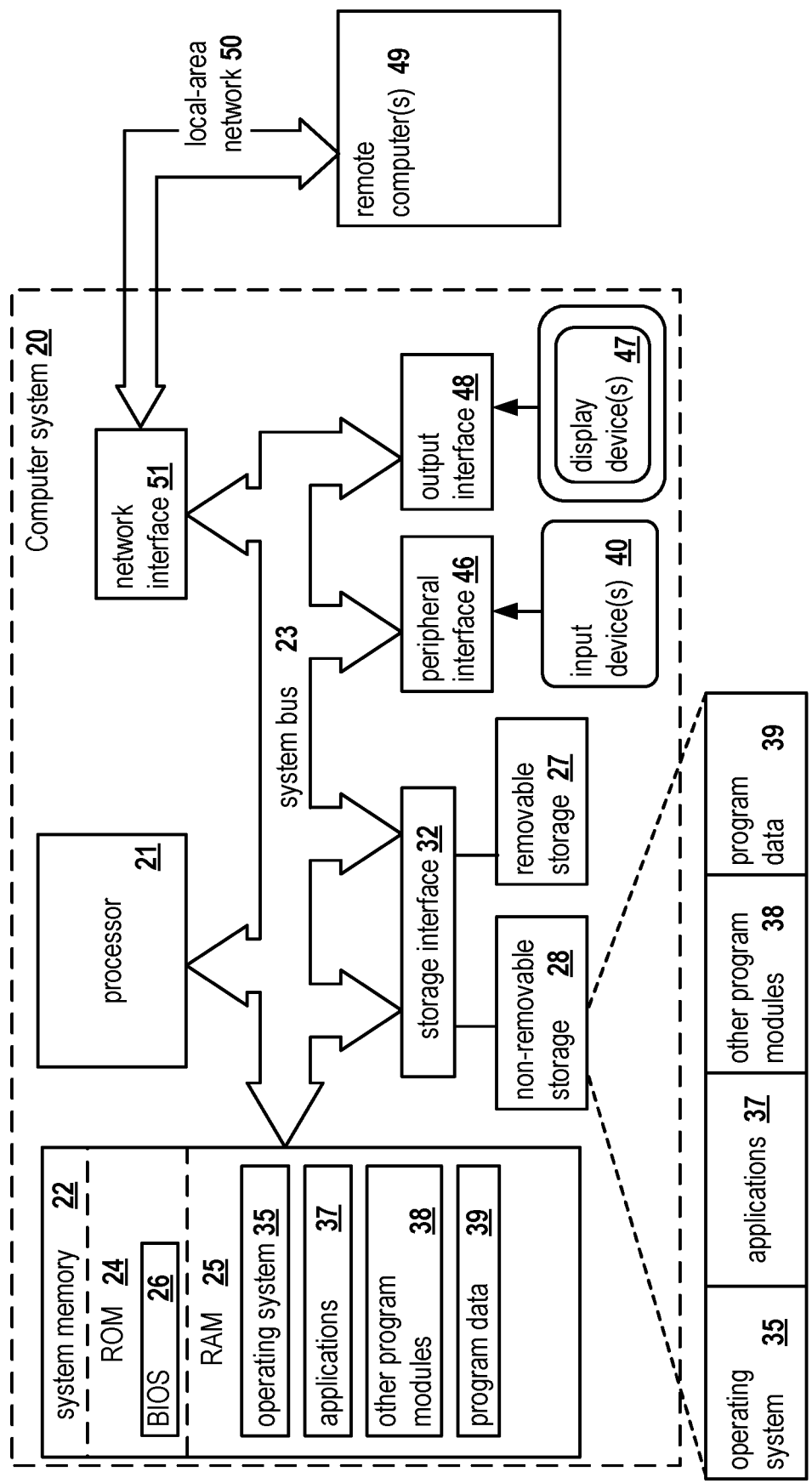
FIG. 6 presents an example of a general-purpose computer system on which aspects of the present disclosure can be implemented.

FIG. 6 is a block diagram illustrating a computer system 20 on which aspects of systems and methods for determining DSI policies based on data file and hardware attributes may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determining data storage insurance policies, the method comprising:
  receiving, from a computing device, a plurality of data files for storage and a request to add at least one data storage insurance policy to the plurality of data files for protection against data loss;
  for each respective data file of the plurality of data files:
    extracting data file attributes comprising information based on at least one of access history, storage at the computing device, and metadata of the respective data file;

determining a data recovery score for the respective data file based on at least one of a uniqueness and a criticality of the respective data file;

determining a hardware score for each of a plurality of performance tiers comprising at least one storage server, based on at least one of an available capacity at each of the plurality of performance tiers and a performance cost for storing the respective data file;

comparing the data recovery score of the respective data file and the hardware score and selecting a data storage insurance policy for the respective data file based at least on the comparison; and executing the data storage insurance policy.

2. The method of claim 1, wherein the data recovery score is further based on an importance of the respective data file.

3. The method of claim 2, wherein the uniqueness is a likelihood of the respective data file being present on a sample computing device, the criticality is a likelihood of a different file on the sample computing device having a dependency on the respective data file, and the importance is a value manually set by a user of the computing device.

4. The method of claim 1, wherein the hardware score is further based on data recovery scores of data files currently stored at each of the plurality of performance tiers.

5. The method of claim 1, wherein selecting the data storage insurance policy for the respective data file is further based on a plurality of data recovery rules.

6. The method of claim 1, wherein storage servers of each of the plurality of performance tiers meet different minimum performance ratings, wherein the minimum performance ratings comprise at least one of: processing speed, memory, storage capacity, data retrieval speed, and network access latency.

7. The method of claim 1, wherein the data storage insurance policy indicates a redundancy of the respective data file, wherein the redundancy comprises storing the respective data file in multiple storage servers of one of the plurality of performance tiers.

8. The method of claim 1, wherein the data storage insurance policy indicates a recovery time threshold that is a maximum amount of time needed to recover the respective data file in an event of data loss.

9. The method of claim 1, wherein the data storage insurance policy indicates a compensation amount provided to the user in an event that the respective data file cannot be recovered due to data loss.

10. The method of claim 1, wherein comparing the data recovery score of the respective data file and the hardware score further comprises determining whether the data recovery score is greater than the hardware score of a given performance tier of the plurality of performance tiers.

11. The method of claim 10, further comprising:
in response to determining that the data recovery score is not greater than the hardware score for any performance tier of the plurality of performance tiers, selecting a data storage insurance policy in which the respective data file is not stored in any of the plurality of performance tiers and the user is compensated in an event of data loss.

12. The method of claim 1, further comprising determining the uniqueness of the respective data file using a machine learning algorithm trained using a dataset that comprises data attributes of sample data files in a plurality of sample computing devices and a count of the plurality of computing devices that include each sample data file.

13. The method of claim 1, further comprising determining the criticality of the respective data file using a machine learning algorithm trained using a dataset that comprises data attributes of sample data files in a plurality of sample computing devices and a count of files on the plurality of computing devices that depend on each sample data file to be accessed.

14. A system for determining data storage insurance policies, the system comprising:
a hardware processor configured to:
receive, from a computing device, a plurality of data files for storage and a request to add at least one data storage insurance policy to the plurality of data files for protection against data loss;
for each respective data file of the plurality of data files:
extract data file attributes comprising information based on at least one of access history, storage at the computing device, and metadata of the respective data file;
determine a data recovery score for the respective data file based on at least one of a uniqueness and a criticality of the respective data file;
determine a hardware score for each of a plurality of performance tiers comprising at least one storage server, based on at least one of an available capacity at each of the plurality of performance tiers and a performance cost for storing the respective data file;
compare the data recovery score of the respective data file and the hardware score;
select a data storage insurance policy for the respective data file based on at least the comparison; and
execute the data storage insurance policy.

15. The system of claim 14, wherein the data recovery score is further based on an importance of the respective data file.

16. The system of claim 15, wherein the uniqueness is a likelihood of the respective data file being present on a sample computing device, the criticality is a likelihood of a different file on the sample computing device having a dependency on the respective data file, and the importance is a value manually set by a user of the computing device.

17. The system of claim 14, wherein the hardware score is further based on data recovery scores of data files currently stored at each of the plurality of performance tiers.

18. The system of claim 14, wherein selecting the data storage insurance policy for the respective data file is further based on a plurality of data recovery rules.

19. The system of claim 14, wherein storage servers of each of the plurality of performance tiers meet different minimum performance ratings, wherein the minimum performance ratings comprise at least one of: processing speed, memory, storage capacity, data retrieval speed, and network access latency.

20. The system of claim 14, wherein the data storage insurance policy indicates a redundancy of the respective data file, wherein the redundancy comprises storing the respective data file in multiple storage servers of one of the plurality of performance tiers.

21. The system of claim 14, wherein the data storage insurance policy indicates a recovery time threshold that is a maximum amount of time needed to recover the respective data file in an event of data loss.

22. The system of claim 14, wherein the data storage insurance policy indicates a compensation amount provided to the user in an event that the respective data file cannot be recovered due to data loss.

23. The system of claim 14, wherein the hardware processor is configured to compare the data recovery score of the respective data file and the hardware score by determining whether the data recovery score is greater than the hardware score of a given performance tier of the plurality of performance tiers.

24. The system of claim 23, wherein the hardware processor is further configured to:
in response to determining that the data recovery score is not greater than the hardware score for any performance tier of the plurality of performance tiers, select a data storage insurance policy in which the respective data file is not stored in any of the plurality of performance tiers and data recovery is not attempted in an event of data loss.

25. The system of claim 14, wherein the hardware processor is further configured to determine the uniqueness of the respective data file using a machine learning algorithm trained using a dataset that comprises data attributes of sample data files in a plurality of sample computing devices and a count of the plurality of computing devices that include each sample data file.

26. The system of claim 14, wherein the hardware processor is further configured to determine the criticality of the respective data file using a machine learning algorithm trained using a dataset that comprises data attributes of sample data files in a plurality of sample computing devices and a count of files on the plurality of computing devices that depend on each sample data file to be accessed.

27. A non-transitory computer readable medium storing thereon computer executable instructions for determining data storage insurance policies, including instructions for:
receiving, from a computing device, a plurality of data files for storage and a request to add at least one data storage insurance policy to the plurality of data files for protection against data loss;
for each respective data file of the plurality of data files:
extracting data file attributes comprising information based on at least one of access history, storage at the computing device, and metadata of the respective data file;
determining a data recovery score for the respective data file based on at least one of a uniqueness and a criticality of the respective data file;
determining a hardware score for each of a plurality of performance tiers comprising at least one storage server, based on at least one of an available capacity at each of the plurality of performance tiers and a performance cost for storing the respective data file;
comparing the data recovery score of the respective data file and the hardware score and selecting a data storage insurance policy for the respective data file based at least on the comparison; and
executing the data storage insurance policy.

\* \* \* \* \*